United States Patent
Takamatsu et al.

(10) Patent No.: US 8,525,455 B2
(45) Date of Patent: Sep. 3, 2013

(54) MOTOR ACTUATION CONTROL DEVICE

(75) Inventors: Naoyoshi Takamatsu, Susono (JP); Masaki Okamura, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 425 days.

(21) Appl. No.: 13/055,832

(22) PCT Filed: Oct. 1, 2009

(86) PCT No.: PCT/JP2009/067154
§ 371 (c)(1),
(2), (4) Date: Jan. 25, 2011

(87) PCT Pub. No.: WO2010/044348
PCT Pub. Date: Apr. 22, 2010

(65) Prior Publication Data
US 2011/0127937 A1    Jun. 2, 2011

(30) Foreign Application Priority Data

Oct. 17, 2008    (JP) ................. 2008-268247

(51) Int. Cl.
*H02P 6/08*    (2006.01)
(52) U.S. Cl.
USPC ............. 318/400.2; 318/400.06; 318/400.14
(58) Field of Classification Search
USPC ............ 318/400.05, 400.06, 400.14, 400.15, 318/400.2, 400.37, 700
See application file for complete search history.

(56) References Cited

U.S. PATENT DOCUMENTS

| 5,969,496 | A | 10/1999 | Yamada et al. |
| 6,388,416 | B1 * | 5/2002 | Nakatani et al. ............... 318/700 |
| 7,436,144 | B2 * | 10/2008 | Yoshimura et al. ........... 318/599 |
| 2008/0315813 | A1 | 12/2008 | Yamada et al. |
| 2010/0127656 | A1 | 5/2010 | Ohtani et al. |

FOREIGN PATENT DOCUMENTS

| JP | 02-202368 A | 8/1990 |
| JP | 2000-014200 A | 1/2000 |
| JP | 3486326 B2 | 10/2003 |
| JP | 2007-159367 A | 6/2007 |
| JP | 2007-185071 A | 7/2007 |
| JP | 2008-312420 A | 12/2008 |

OTHER PUBLICATIONS

International Preliminary Report on Patentability issued in PCT/JP2009/067154 issued May 17, 2011 (5 pages).
International Search Report for PCT/JP2009/067154 dated Jan. 12, 2010.

* cited by examiner

*Primary Examiner* — Bentsu Ro
(74) *Attorney, Agent, or Firm* — Sughrue Mion, PLLC

(57) ABSTRACT

A triangle wave generator (4) measures the phase difference between a triangle wave (CA) and the rotor electrical angle ($\theta_m$) during a first cycle in which the rotation rate of a rotor (7) is detected, and changes the frequency of the triangle wave (CA) when the value of the phase difference between the triangle wave (CA) and the rotor electrical angle ($\theta_m$) exceeds a threshold value, thereby allowing rapid response to changes in rotor rotation when PWM control is performed.

3 Claims, 9 Drawing Sheets

MOTOR ACTUATION CONTROL DEVICE

BACKGROUND OF THE INVENTION

1. Field of the Invention

The present invention relates generally to a motor actuation control device, and particularly to a motor actuation control device which is capable of steadily controlling a motor even during rapid changes in the rotation rate of the rotor.

2. Description of the Related Art

In most motor vehicles, including electric vehicles and hybrid vehicles, a direct current power source such as a battery is provided, and an alternating current motor is provided as a power source. In addition, an inverter is provided between the direct current power source and the alternating current motor to convert the direct current power to the alternating current power.

PMW (pulse width modulation) control is a known technique for controlling the alternating current motor via inverters. PWM control is one type of voltage conversion control techniques for voltage type inverters, in which a pulse signal called a PWM signal is supplied to a switching element provided in the inverter to control on/off timing of the switching element. By adjusting the on/off timing of the switching element, it is possible to control the voltage applied to the motor.

PWM signals are generated through a triangle wave comparison method. Specifically, a command signal which determines a voltage value to be applied to the motor is compared to a voltage value of a triangle wave which is also called a carrier wave to generate a PWM signal.

The voltage value of the command signal is determined continuously based on a rotor electrical angle and a torque requirement value. The command signal generally has a sinusoidal waveform and the cycle of the command signal is increased or decreased according to changes of the torque requirement value and the rotation rate of the rotor when the synchronous motor, such as a permanent magnet motor, is used.

The triangle wave is generated through integration of clock signals. The frequency of the clock signals are set by a control unit or the like provided in the motor vehicle.

In generating the PWM signal, the number of pulses of the PWM signal provided during one cycle of the command signal is determined by the ratio of the frequency of the triangle wave to the frequency of the command signal. For example, if the ratio of the frequency of the triangle wave to the frequency of the command signal is 15, then fifteen pulses are provided in the PWM signal during one cycle of the command signal.

On the other hand, if the inverter turns on and off a great number of times within a short period of time, switching loss occurs and the switching element may as a result become overheated, which may lead to performance errors of the element. Measures to avoid overheating of the switching element, such as providing more than one switching element to disperse heat and prevent overheating, have been attempted, but, in order to reduce costs and for other reasons, modern inverters include fewer switching elements compared than earlier conventional inverters. Because the preventive measure noted above cannot be applied to such inverters, the number of pulses of the PWM signal during one cycle of the command signal must be set to a relatively small number.

However, when the number of pulses of the PWM signal during one cycle period of the command signal is set to a relatively small number, it is necessary to change the frequency of the clock signal in response to changes of the frequency of the command signal and maintain the number of pulses of the PWM signal during one cycle period of the command for the sake of the stable PWM control.

For example, if it is desired to increase the rotation rate of the rotor, the frequency of the command signal is increased as well. In contrast, if the frequency of the clock signal is fixed, the number of pulses of the PWM single during one cycle of the command signal is decreased.

If a relatively large number of pulses (e.g., 15-20 pulses) are included in the PWM signal during one cycle of the command signal, the influence of the decrease in the number of pulses may be small. On the other hand, however, if the number of pulses included in the PWM signal during one cycle of the command signal is relatively small (e.g., 5-10 pulses), the pulse number decrease gives a greater influence. In this case, as the number of pulses of the PWM signal during one cycle of the command signal is decreased, the inverter is not able to output an expected voltage as designated by the command signal. Eventually, a control failure, such as overload of the inverter, detuning of the motor, or the like, may occur To deal with this problem, a control method has been known in which the frequency of the triangle wave is changed before rapid changes in the rotation rate (rpm) of the rotor and a change of the number of pulses of the PWM signal, while the number of pulses of the PWM signal is maintained at a fixed value. For example, Japanese Patent Laid-Open Publication No. 2007-159367 (Patent Document 1) discloses a technique in which the frequency of the triangle wave is raised when the increasing ratio of the rotation rate of the rotor exceeds a threshold value.

Patent Document 1: Japanese Patent Laid-Open Publication No. 2007-159367

The rotation rate of the rotor is not calculated until after the rotor is rotated to some extent. Usually, the rotation rate of the rotor is calculated from the change of the electrical angle of the rotor during a predetermined time period while considering external factors, such as changes in the torque requirement value, the running resistance, etc. Because performing such calculation requires about 1 to 3 milliseconds, the frequency of the clock signal is adjusted about every 1 to 3 milliseconds.

On the other hand, the rotor electrical angle continuously increases and decreases in proportion to the rotation of the motor, particularly, for example, when road conditions cause tire slip to occur in a motor vehicle. This may cause the rotor electrical angle to change rapidly. In response, the frequency of the command signal may also change rapidly in less than 1 to 3 milliseconds, thereby increasing or decreasing the number of pulses of the PWM signal during one rotation of the rotor.

In consideration of the above, an object of the present invention is to enable rapid response to changes in the rotation of the motor when PWM control is performed.

SUMMARY OF THE INVENTION

A motor actuation control device according to the present invention includes a control unit which outputs a command signal and a triangle wave to generate a PWM signal, and an angle sensor which detects a rotor electrical angle. The control unit outputs the command signal by determining a voltage value of the command signal based on the rotor electrical angle and a torque requirement value. The control unit also calculates a rotation rate of the rotor for a first cycle based on the rotor electrical angle, and determines the frequency of the triangle wave for the first cycle based on the rotor rotation rate to output the triangle wave. Then, the control unit detects a phase difference between the triangle wave and the rotor electrical angle for a second cycle which is shorter than the first cycle, and changes the frequency of the triangle wave when the value of the phase difference between the phase angle of the triangle wave and the rotor electrical angle exceeds a predetermined threshold value.

In a motor actuation control device according to the present invention, the control unit stores the number of pulses to be output in the PWM signal during one cycle of the command signal as a designated pulse number. The control unit calculates a reference angle by multiplying the rotor electrical angle by the designated pulse number, detects the phase difference between the phase angle of the triangle wave and the reference angle, and changes the frequency of the triangle wave when the phase difference between the phase angle of the triangle wave and the reference angle exceeds a threshold value.

Also, in a motor actuation control device according to the present invention, the threshold value is set to ±180°.

With the present invention, it is possible to change the frequency of the triangle wave based on an instantaneous value for the rotor electrical angle. As a result, increase or decrease of the number of pulses of the PWM signal is reliably prevented, as compared to changing the frequency based on the information of the rotor rotation rate that is calculated through a certain time interval.

DETAILED DESCRIPTION OF EXAMPLE EMBODIMENTS

A preferred embodiment of the present invention will be described below with reference to the attached drawings.

Figure 1:
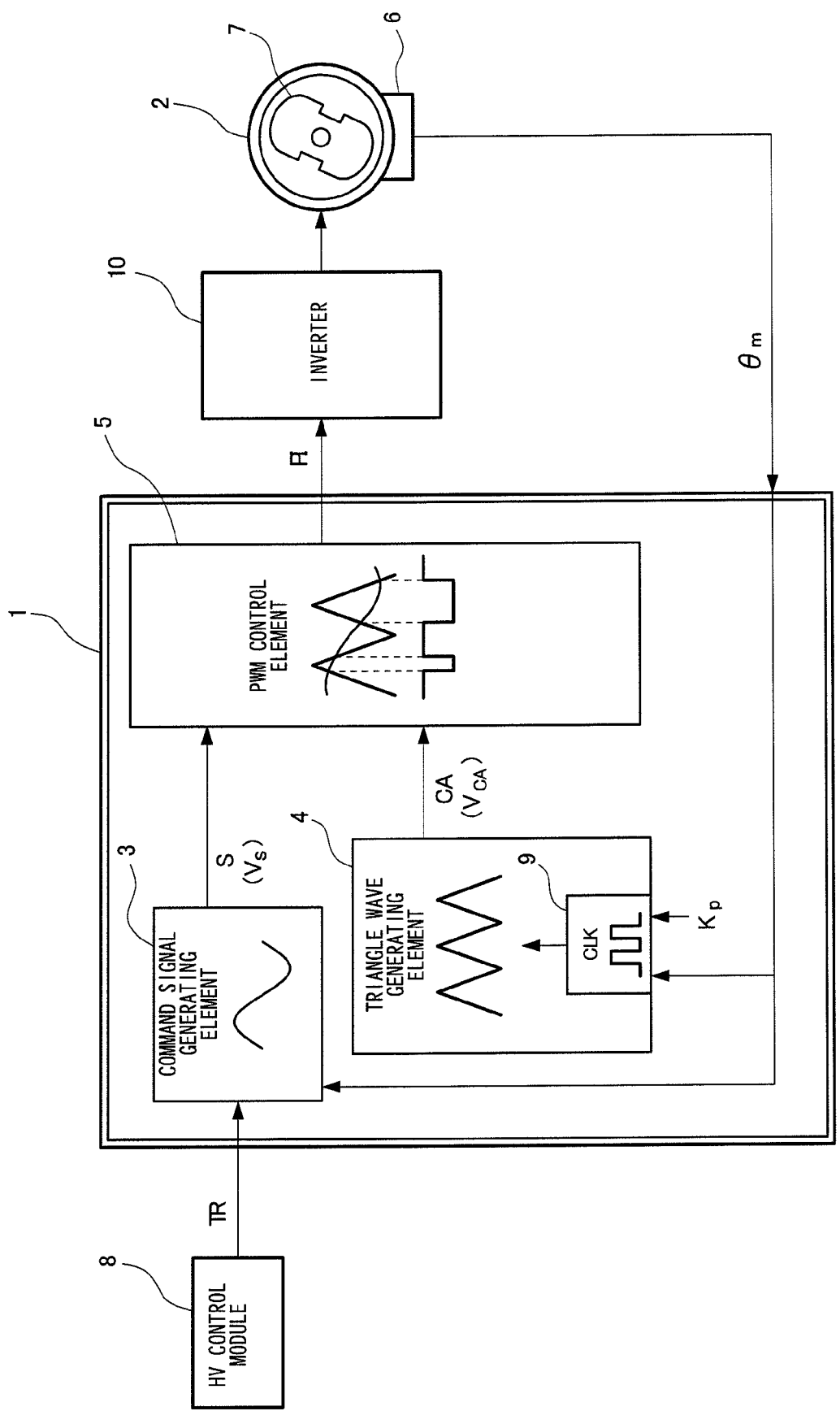
FIG. 1 is a schematic diagram showing a control unit, a motor, and peripheral components thereof.

FIG. 1 is a schematic diagram showing a control unit 1, a motor to be controlled 2, and peripheral components thereof. In this embodiment, the motor 2 is a synchronous motor, such as an permanent magnet motor.

The configuration of the control unit 1 is explained below. The control unit 1 includes a command signal generating element 3, a triangle wave generating element 4, and a PWM control element 5.

The command signal generating element 3 generates a command signal S and supplies it to the PWM control element 5. The triangle wave generating element 4 generates a triangle wave CA and supplies it to the PWM control element 5. The PWM control element 5 receives the command signal S and the triangle wave CA and generates a PWM signal PI. In the following description, operations, process steps, etc. to be carried out in each of the command signal generating element 3, the triangle wave generating element 4, and the PWM control element 5 are described in detail.

First, the command signal generating element 3 is explained. The command signal generating element 3 receives an electrical angle of a rotor 7 from a rotational angle sensor 6, such as a resolver, and also receives a torque requirement value TR from a HV control module 8. Then, the command signal generating element 3 generates a command signal S based on the received electrical angle θm and the torque requirement value TR. It is noted that a motor vehicle described in this embodiment is typically a hybrid vehicle, so that the HV control module 8 detects a depression amount of the accelerator pedal and calculates the torque requirement value TR to be transmitted to the motor 2 and the engine that is not shown.

The command signal generating element 3 calculates a voltage value $V_s$ of the command signal S based on the signal representing the rotor electrical angle $\theta_m$ and the torque requirement value TR. The command signal S is sent to the PWM control element 5. As the command signal generating element 3 continuously receives the rotor electrical angle $\theta_m$ and the torque requirement value TR, the voltage value $V_s$ of the command signal S is also calculated continuously. Because the command signal S is output synchronously with the rotation of the rotor 7, the cycle of the command signal S is substantially in tune with the cycle of the rotor electrical angle $\theta_m$.

Next, the triangle wave generating element 4 is explained. The triangle wave generating element 4 includes a clock signal generator 9 which outputs a clock signal CLK. The triangle wave generating element 4 supplies the clock signal CLK to an integrating circuit to generate a triangle wave CA. The control unit 1 stores a designated pulse number $K_p$ which is used to output the clock signal CLK. The designated pulse number $K_p$ is the number of pulses to be generated in the PWM signal PI during the interval corresponding to one cycle of the command signal S. The designated pulse number $K_p$ may be preset in the control unit 1, or otherwise be appropriately determined and by operators.

The triangle wave CA is generated as described below. The triangle wave generating element 4 receives the electrical angle of the rotor $\theta_m$ from the rotational angle sensor 6. Further, the triangle wave generating element 4 measures values of the rotor electrical angle $\theta_m$ until the rotor 7 is rotated once, calculates a rotation rate Rmm (rpm) of the rotor when the rotor 7 is rotated once, and stores it. It takes about 1 to 3 milliseconds for one rotation of the rotor 7. Therefore, the triangle wave generating element 4 calculates the rotation rate Rmm of the rotor for every 1 to 3 milliseconds and updates the stored rotation rate Rmm of the rotor.

Then, the triangle wave generating element 4 calculates a rotational frequency $f_m$, of the rotor from the rotation rate Rmm of the rotor, and multiplies the frequency $f_m$, the number of pole pairs of the rotor 7, and the designated pulse number $K_p$ together to get a frequency $f_{CLK}$ of the clock signal. The clock signal CLK is integrated in the integrating circuit to generate the triangle wave CA which is then sent to the PWM control element 5.

The PWM control element 5 compares the magnitude of the voltage value $V_s$ of the command signal S to the voltage value $V_{CA}$ of the triangle wave CA, and generates the PWM signal PI, which is a pulse signal, based on the result of this comparison.

The PWM signal PI output from the PWM control element 5 is sent to an inverter 10. In the inverter 10, on/off control of the switching element is performed based on the PWM signal PI, such that the DC voltage applied to the inverter 10 is converted to an actuation voltage for actuating the motor 2. The motor 2 works to generate torque corresponding to the torque requirement value TR from the HV control module 8.

In the following, the motor actuation control carried out by the control unit 1 will be described with reference to FIGS. 2-9.

First Embodiment of the Motor Actuation Control

The control unit 1 calculates a phase difference between the rotor electrical angle $\theta_m$ and the phase angle $\theta_{CA}$ of the triangle wave CA, compares the phase difference with a predetermined threshold value and, when the phase difference exceeds the threshold value, determines that the rotation rate of the rotor 7 is rapidly changed, thereby changing the frequency of the triangle wave CA during one rotation of the rotor 7. By such motor actuation control, the number of pulses of the PWM signal PI during one cycle of the command signal S is kept to the designated pulse number $K_p$. In the following, the motor actuation control according to this embodiment will be described in detail.

The triangle wave generating element 4 provided in the control unit 1 measures the phase difference between the rotor electrical angle $\theta_m$ and the phase angle $\theta_{CA}$ of the triangle wave CA at each predetermined measurement timing during one rotation of the rotor 7.

Figure 2:
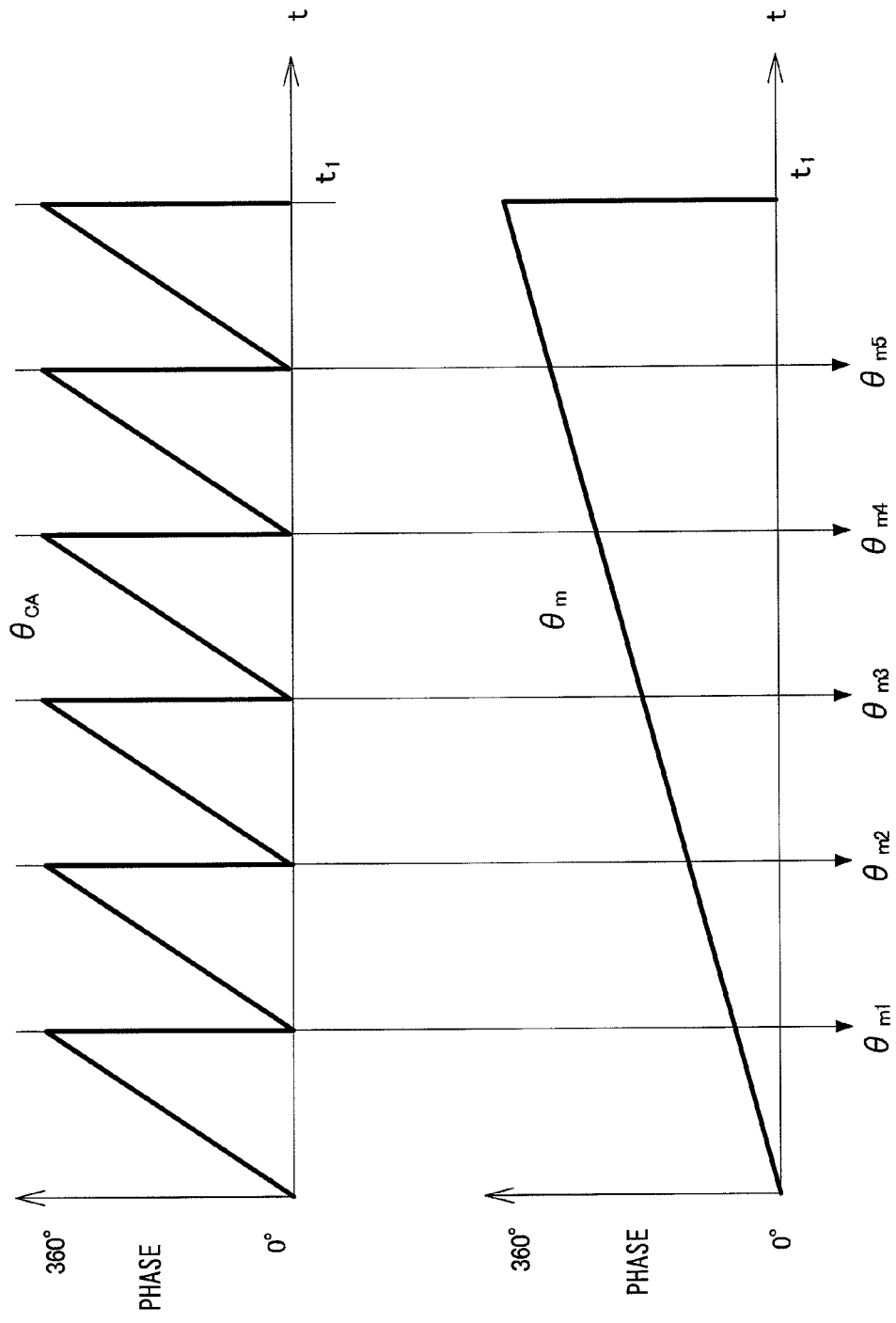
FIG. 2 shows time varying phase angles of a rotor electrical angle and a triangle wave.

FIG. 2 shows the time varying phase shift of the rotor electrical angle $\theta_m$ and the phase angle $\theta_{CA}$ during the cycle t1 (sec) of the rotor electrical angle $\theta_m$. Herein, the designated pulse number $K_p$ is set to 6. In this embodiment, the measurement timing is when the phase angle $\theta_{CA}$ of the triangle wave is 0°. By setting the measurement timing as such, because $\theta_{CA}=0°$, the phase difference $\Delta\theta$ between the rotor electrical angle $\theta_m$ and the phase angle $\theta_{CA}$ of the triangle wave CA equals to the rotor electrical angle $\theta_m$, thereby facilitating the measurement. As shown in FIG. 2, the triangle wave generating element 4 samples values of the rotor electrical angle $\theta_m$ for each cycle of the triangle wave CA. In the operation shown in FIG. 2, the rotor electrical angle $\theta_m$ is acquired five times from $\theta_{m1}$ to $\theta_{m5}$, and the difference between each of these values and a threshold value is measured.

The triangle wave generating element 4 sets two kinds of threshold values consisting of an upper threshold value $Th\theta_{m\_}UL$ and a lower threshold value $Th\theta_{m\_}LL$. The upper threshold value $Th\theta_{m\_}UL$ and the lower threshold value $Th\theta_{m\_}LL$ are set as described below.

For example, when the upper threshold value $Th\theta_{m\_}UL$ and the lower threshold value $Th\theta_{m\_}LL$ are set for the rotor electrical angle $\theta_{m1}$ when the triangle wave CA enters the second cycle, the upper and lower threshold values are calculated based on the conditions where the number of pulses output in the PWM signal PI during one cycle of the command signal S is greater or smaller than the designated pulse number $K_p$. For example, if the designated pulse number $K_p$ is 6, the number of pulses output in the PWM signal PI during one cycle of the command signal S becomes a value other than 6 when the triangle wave CA has five or less or seven or more cycles during one cycle of the command signal S. Considering that the number of cycles of the command signal S is substantially the same as the number of cycles of the rotor electrical angle $\theta_m$ of the rotor 7, the number of pulses of the PWM signal PI during one cycle of the command signal S becomes a value other than the designated pulse number when the triangle wave CA has 5 or less or 7 or more cycles during one cycle of the rotor electrical angle $\theta_m$.

If five cycles are output in the triangle wave CA during one cycle of the rotor electrical angle $\theta_m$, the rotor electrical angle $\theta_m$ is 360°/5=72° at the end of the first cycle of the triangle wave CA to give the upper threshold value $Th\theta_{m1\_}UL$ of 72°.

On the other hand, if seven cycles are output in the triangle wave CA during one cycle of the rotor electrical angle $\theta_m$, the rotor electrical angle $\theta_m$ is 360°/7=51.4° at the end of the first cycle of the triangle wave CA to give the lower threshold value $Th\theta_{m1\_}LL$ of 51.4°.

Figure 3:
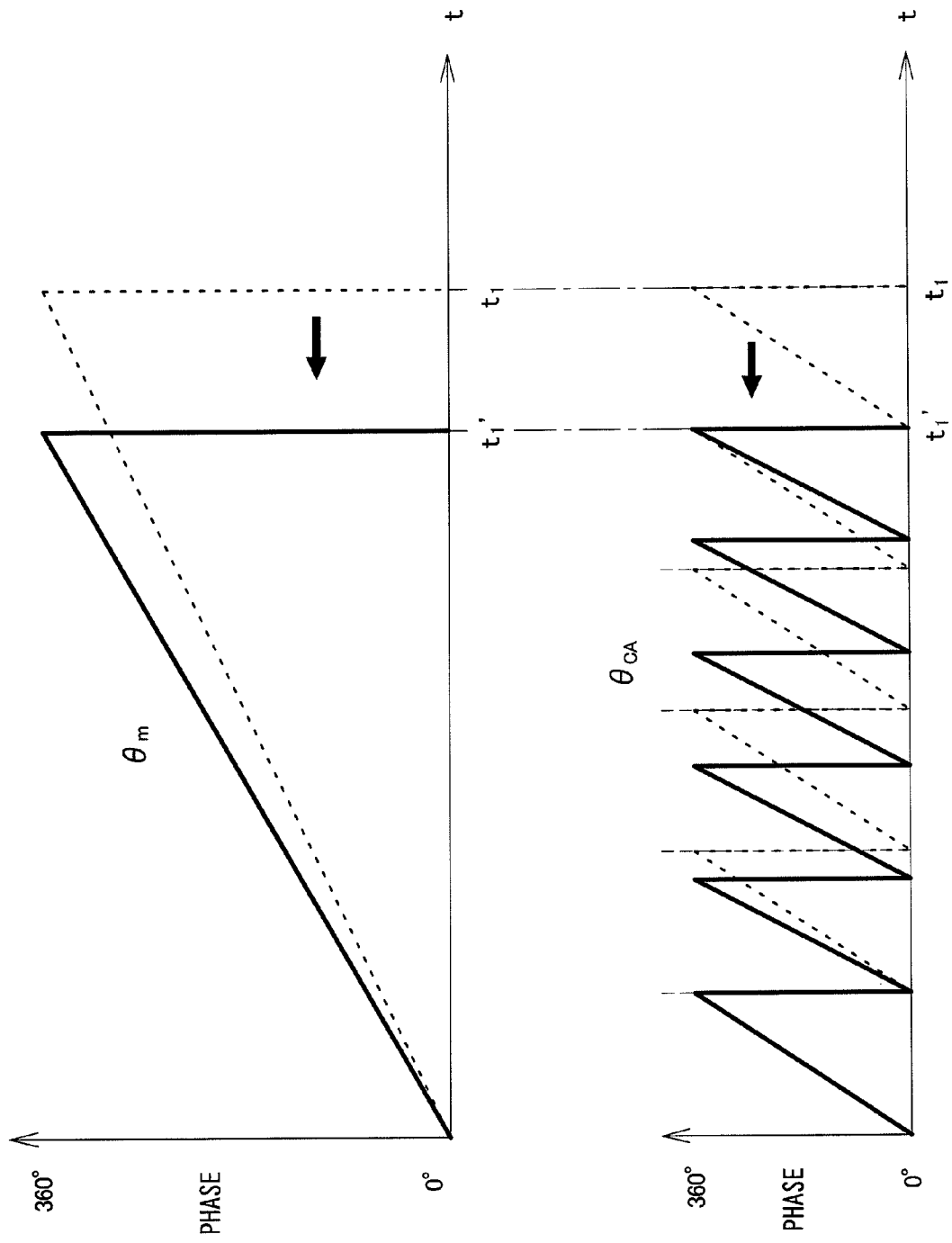
FIG. 3 shows the phase of the rotor electrical angle and the triangle wave when the motor actuation control according to the present invention is performed.

As such, the upper and lower threshold values for $\theta_{m2}$ to $\theta_{m5}$ are calculated successively. When the upper and lower threshold values for $\theta_{m\,2}$ to $\theta_{m5}$ are calculated, each threshold value is set in the triangle wave generating element 4. When any of the rotor electrical angles $\theta_{m1}$ to $\theta_{m5}$ is at or below the lower threshold value, or at or above the upper threshold value, the triangle wave generating element 4 then changes the frequency of the triangle wave CA. By changing the frequency of the triangle wave CA, the time taken to get six cycles in the triangle wave CA is reduced from t1 to t1', as shown in FIG. 3. In the example shown in FIG. 3, the frequency of the triangle wave CA is increased by detecting that the rotor electrical angle $\theta_m$ is at or above the upper threshold value. By increasing the frequency of the triangle wave CA, the number of pulses output in the PWM signal PI during one cycle of the command signal S can be changed from five to six.

Concerning the calculation cycle, instead of setting it to the interval between 0° to the next 0° of the phase angle of the triangle wave CA, the calculation cycle may be set as desired.

Second Embodiment of the Motor Actuation Control

In the above description, the phase difference between the rotor electrical angle $\theta_m$ and the phase angle of the triangle wave CA is directly measured, but a reference angle, which will be described below, may be calculated as a virtual angle value to facilitate measurement of the phase $\theta_m$ triangle wave CA.

A reference angle $\theta_s$ is calculated using the following Equation 1:

$$\theta_s = (K_p \times \theta_m) - (360° \times b) \qquad \text{Equation 1}$$

wherein $K_p$ is a designated pulse number and b is a coefficient to be set based on the value of the rotor electrical angle $\theta_m$.

The coefficient b is next explained. The value for b may be any natural number from 0 to $K_p-1$. The triangle wave generating element 4 sets the value of b. Specifically, b=0 while the rotor electrical angle $\theta_m$ is between 0° and 60°. b=1 while the rotor electrical angle $\theta_m$ is between 61° and 120°. In this way, the value of b is incremented by 1 every time the rotor electrical angle $\theta_m$ is increased 60°. When the rotor electrical angle $\theta_m$ is 360°, the triangle wave generating element 4 returns b to zero. After that, the process is repeated. In this case, the rotor electrical angle $\theta_m$, the coefficient b, and the reference angle $\theta_s$ are changed as in the following table 1. It is noted that the designated pulse number $K_p$ is set to 6.

TABLE 1

| Rotor Electrical Angle $\theta_m$ | 0°~60° | 61°~120° | 121°~180° | 181°~240° | 241°~300° | 301°~360° |
|---|---|---|---|---|---|---|
| Coefficient ($K_P=6$) | 0 | 1 | 2 | 3 | 4 | 5 |
| Reference Angle $\theta_s$ | 0°~360° | 1°~360° | 1°~360° | 1°~360° | 1°~360° | 1°~360° |

It can be recognized that the phase angle $\theta_{CA}$ of the triangle wave CA and the reference angle $\theta_s$ are in-phase when the rotor 7 rotates at a steady speed because both the reference angle $\theta_s$ and the triangle wave CA complete six cycles during one cycle of the rotor electrical angle $\theta_m$. By calculating the reference angle $\theta_s$ so that it has the same cycle and phase as the triangle wave CA, the phase difference between the rotor electrical angle $\theta_m$ and the phase angle $\theta_{CA}$ of the triangle wave CA can be detected more easily.

If, when calculating the reference angle $\theta_s$, the control unit 1 does not consider the component 360°×n (n is a natural number not less than 1), the equation will be $\theta_s=(K_p \times \theta_m)$.

Figure 4:
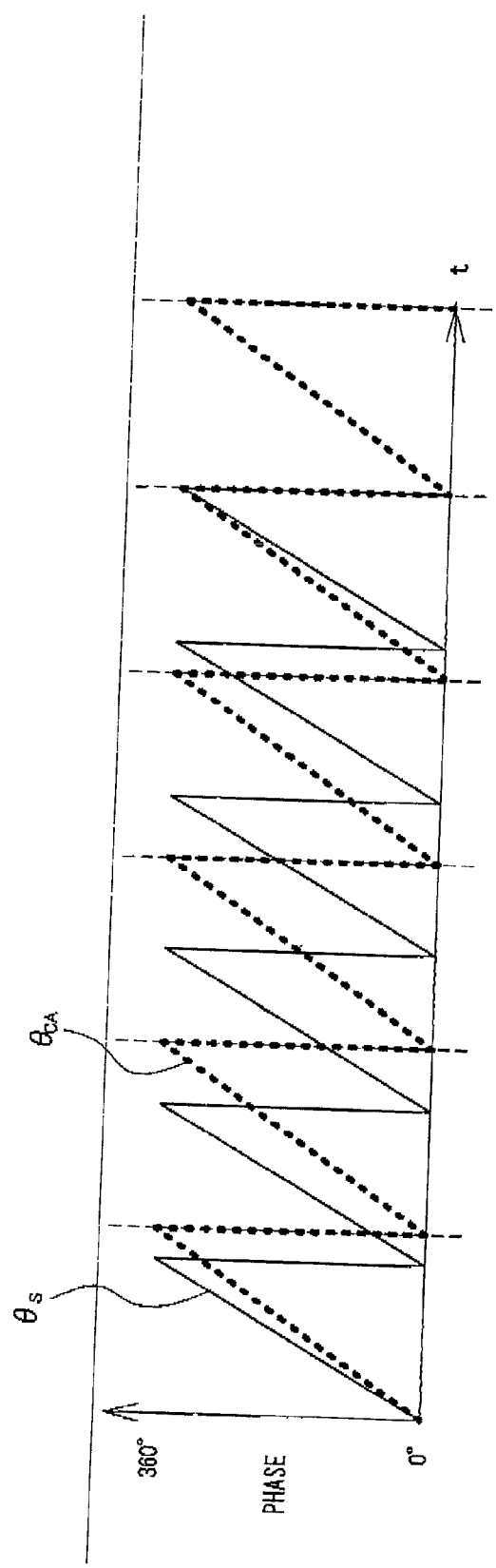
FIG. 4 shows the phase of the triangle wave and the reference angle when the rotor rotation rate is rapidly changed.
Figure 5:
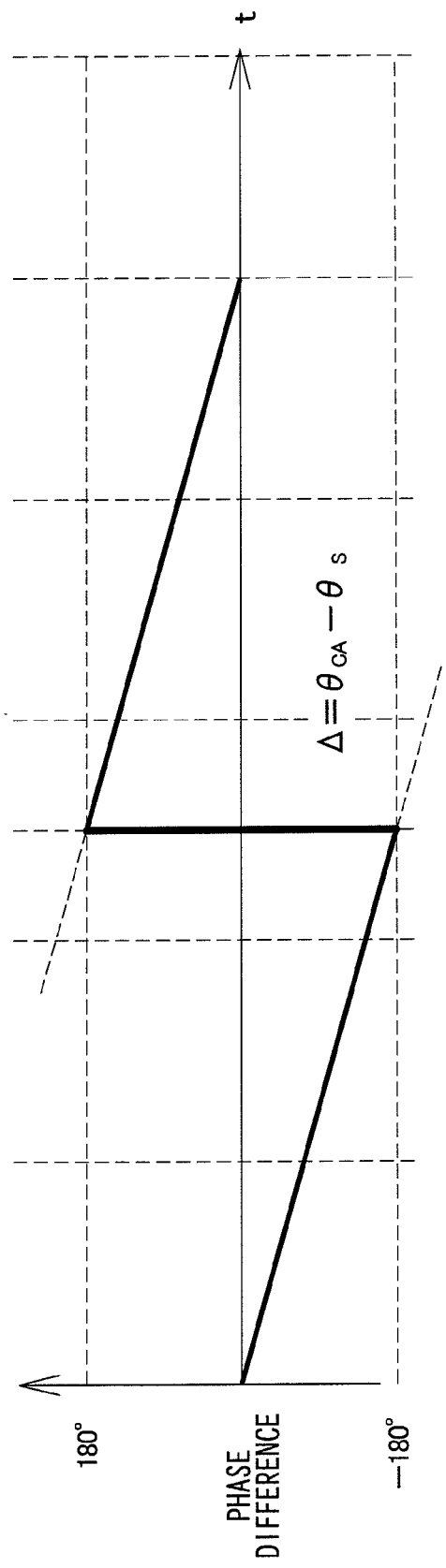
FIG. 5 shows the phase of the triangle wave and the reference angle when the rotor rotation rate is rapidly changed.

FIGS. 4 and 5 show the reference angle $\theta_s$ and the phase angle of the triangle wave $\theta_{CA}$ when the rotation rate of the rotor 7 changes rapidly due to tire slip or the like.

In response to the rapid change of rotation rate of the rotor 7, the reference angle $\theta_s$ calculated from the rotor electrical angle $\theta_m$ is also changed rapidly. On the other hand, in the conventional motor actuation control, the cycle of the triangle wave CA does not change until after the rotor completes one rotation. Therefore, the phase angle of the triangle wave CA gradually becomes out of phase with the reference angle $\theta_s$, and the phase of the triangle wave CA is delayed from the phase of the reference angle $\theta_s$, as shown in FIG. 4.

FIG. 5 shows the time varying phase difference between the phase angle $\theta_{CA}$ of the triangle wave CA and the reference angle $\theta_s$. The phase difference between the phase angle $\theta_{CA}$ of the triangle wave CA and the reference angle $\theta_s$ increases linearly along a linear function over the interval between 0° and 180°. When the phase difference exceeds −180°, the phase difference is measured between the third cycle of the phase angle $\theta_{CA}$ of the triangle wave CA and the fourth cycle of the reference angle $\theta_s$, instead of measuring the phase difference between the third cycle of the phase angle $\theta_{CA}$ of the triangle wave CA and the third cycle of the reference angle $\theta_s$. That is to say, the number of cycles of the phase angle $\theta_{CA}$ of the triangle wave CA differs from that of the reference angle $\theta_s$ by 1 cycle in measuring the phase difference. After that, calculation of the phase difference continues by comparing the phase angle $\theta_{CA}$ of the triangle wave CA with the reference angle $\theta_s$, with the number of cycles of both angles being mismatched by one cycle. As a result, as shown in FIG. 4, there are only five cycles in the triangle wave CA during six cycles of the reference angle $\theta_s$. In this case, the PWM signal PI has five pulses, which is less than the designated pulse number of six, during one cycle of the command signal S, which may cause the malfunction of the control unit 1.

As described above, when the phase difference between the phase angle $\theta_{CA}$ of the triangle wave CA and the reference angle $\theta_s$ exceeds 180°, there is a mismatch in the number of cycles of the phase angle $\theta_{CA}$ of the triangle wave CA and the reference angle $\theta_s$. In this embodiment, therefore, the frequency of the triangle wave CA is changed before the phase difference between the phase angle $\theta_{CA}$ of the triangle wave CA and the reference angle $\theta_s$ exceeds 180°.

Specifically, the triangle wave generating element 4 measures the phase difference between the phase angle $\theta_{CA}$ of the triangle wave CA and the reference angle $\theta_s$ for each predetermined calculation cycle, calculates the phase difference value of the next calculation cycle succeeding to the current cycle based on the phase difference value of the current and previous calculation cycles, and determines whether or not an obtained value deviates from ±180°. This control method will be described below with reference to FIGS. 6-8.

Figure 6:
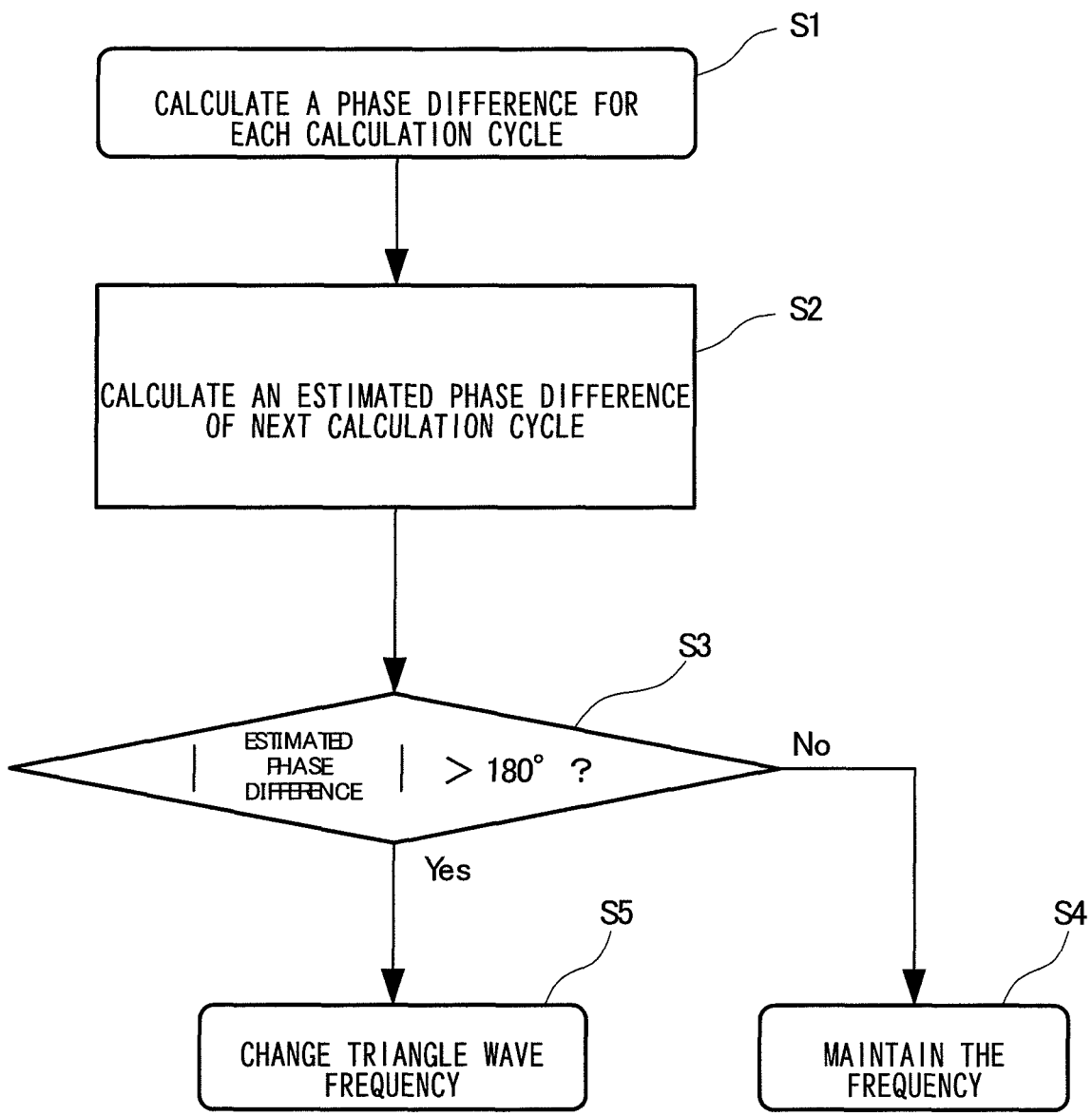
FIG. 6 is a flowchart to determine whether or not the cycle of the triangle wave should be changed.
Figure 7:
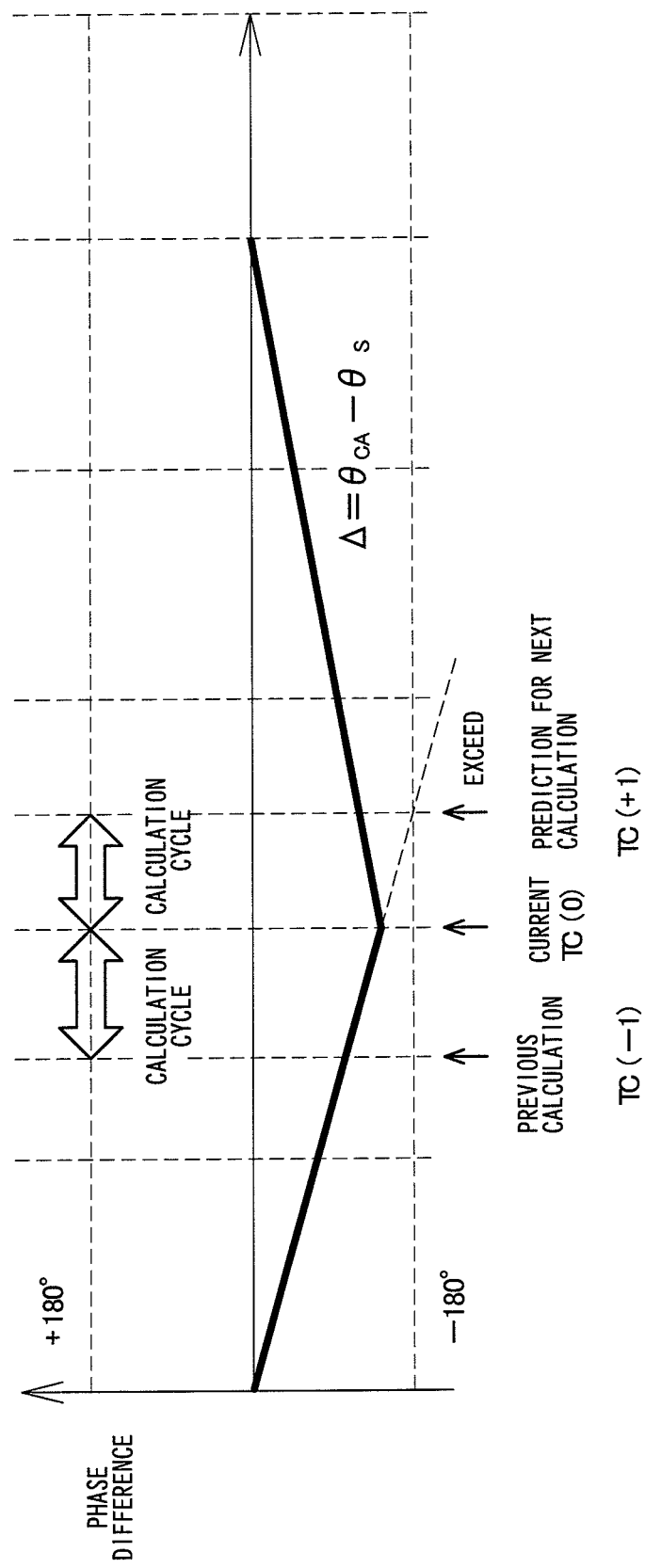
FIG. 7 shows an example of the phase of the triangle wave and the reference angle and the phase difference therebetween when the motor actuation control according to the present invention is performed.

FIG. 6 is a flowchart for determining whether or not the triangle wave generating element 4 should change the cycle of the triangle wave CA. The calculation cycle is set in the triangle wave generating element 4 to calculate the phase difference between the phase angle $\theta_{CA}$ of the triangle wave CA and the reference angle $\theta_s$ (S1).

The triangle wave generating element 4 measures the phase difference between the phase angle $\theta_{CA}$ of the triangle wave CA and the reference angle $\theta_s$ for each calculation period, calculates the slope of a line representing the increase in phase difference, based on the phase difference between the phase angle $\theta_{CA}$ of the triangle wave CA and the reference angle $\theta_s$ for the current calculation cycle TC(0) and the previous calculation cycle TC(−1), and then calculates the phase difference between the phase angle $\theta_{CA}$ of the triangle wave CA and the reference angle $\theta_s$ for the next calculation cycle TC(+1) (S2 in FIG. 6).

Figure 8:
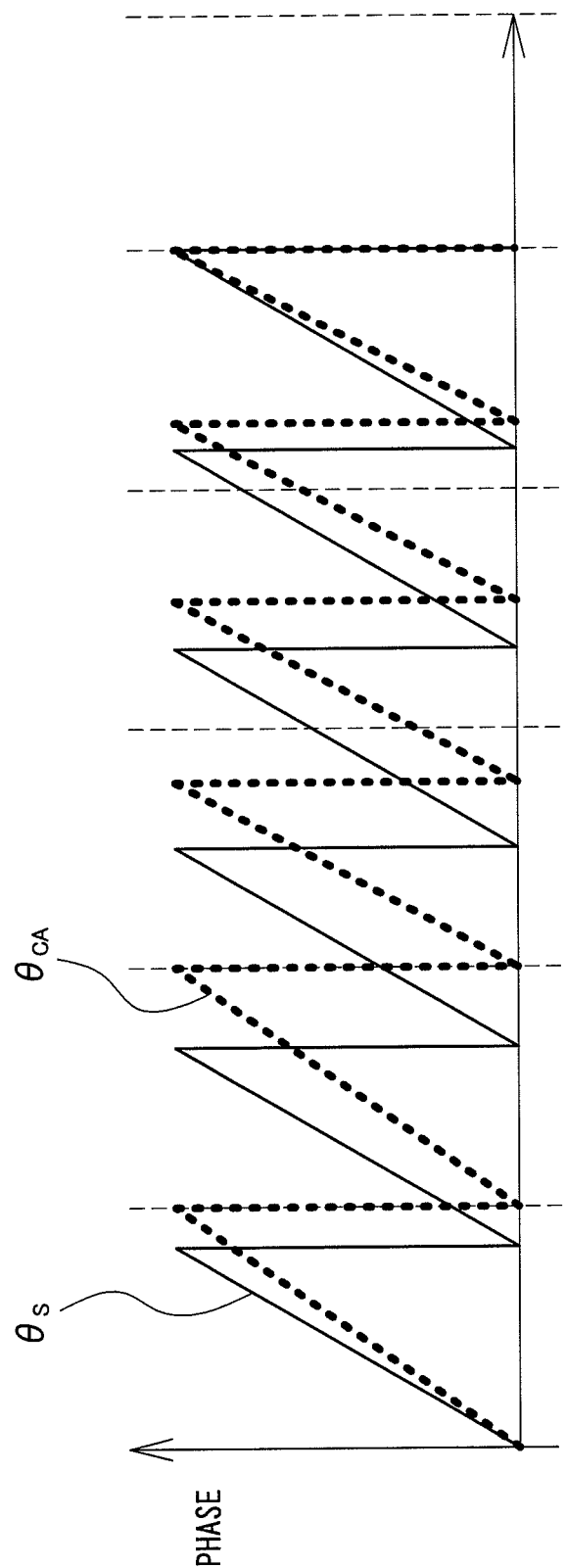
FIG. 8 shows another example of the phase of the triangle wave and the reference angle and the phase difference therebetween when the motor actuation control according to the present invention is performed.

The triangle wave generating element 4 determines whether or not the phase difference between the phase angle $\theta_{CA}$ of the triangle wave CA and the reference angle $\theta_s$ is at or below −180° or at or above 180° for the next calculation cycle TC (+1) (S3). If the phase difference falls within the range between −180° and +180°, the frequency of the triangle wave CA is not changed (S4), but if it is determined that the phase difference is at or below −180° or at or above +180°, the frequency of the triangle wave CA is changed (S5). As a result, the phase difference between the phase angle $\theta_{CA}$ of the triangle wave CA and the reference angle $\theta_s$ is gradually decreased, allowing the triangle wave CA to output six cycles during six cycles of the reference angle $\theta_s$, as shown in FIG. 8.

If it is determined that the phase difference between the phase angle $\theta_{CA}$ of the triangle wave CA and the reference angle $\theta_s$ is at or below −180° during the current calculation cycle TC (+1), the triangle wave generating element 4 increases the frequency of the clock signal CLK that forms the triangle wave CA to advance the phase of the signal, because the phase angle $\theta_{CA}$ of the triangle wave CA is delayed from the reference angle $\theta_s$. By advancing the phase, the phase difference between the phase angle $\theta_{CA}$ of the triangle wave CA and the reference angle $\theta_s$ is diminished, thereby preventing malfunction of the control unit 1.

In addition, at the next operation cycle TC (+1) after the current period, if it is determined that the phase difference between the phase angle $\theta_{CA}$ of the triangle wave CA and the reference angle $\theta_s$ is at or above +180°, which represents that the phase angle $\theta_{CA}$ of the triangle wave CA is advanced from the phase of the reference angle $\theta_s$, the triangle wave generating element 4 decreases the frequency of the clock signal CLK from the current frequency to delay the phase of the triangle wave CA.

As such, with this embodiment, it is possible to estimate the deviation of the phase difference between the phase angle $\theta_{CA}$ of the triangle wave CA and the reference angle $\theta_s$ from ±180°, thereby preventing malfunction of the control unit 1.

Third Embodiment of the Motor Actuation Control

In the above embodiment, the deviation of the phase difference from ±180° between the phase angle $\theta_{CA}$ of the triangle wave CA and the reference angle $\theta_s$ is predicted based on the phase difference between the phase angle $\theta_{CA}$ of the triangle wave CA and the reference angle $\theta_s$ over the interval from the current calculation cycle TC (0) to the previous operation cycle (TC−1). Instead, it is also possible to change the frequency of the triangle wave CA by setting a predetermined threshold value and detecting whether or not the value of the phase difference between the phase angle $\theta_{CA}$ of the triangle wave CA and the reference angle $\theta_s$ exceeds the threshold value. In this case, the threshold value may be any value between −180° and +180°, because the phase difference between the phase angle $\theta_{CA}$ of the triangle wave CA and the reference angle $\theta_s$ may take any value as long as it does not exceed ±180°. For example, when the phase difference between the phase angle $\theta_{CA}$ of the triangle wave CA and the reference angle $\theta_s$ is measured continuously, ±180° is set as the threshold value.

By assuming that tire slip does occur, it is also possible to calculate the threshold value in advance from the difference in rotation rate Δr between the rotation rate Rma, which is the rotation rate during tire slip, and the rotor rotation rate Rmm, which is the rotation rate stored in the triangle wave generating element 4. Specifically, an increase amount X, which represents the amount that the phase difference between the phase angle $\theta_{CA}$ of the triangle wave CA and the reference angle $\theta_s$ increases during one calculation cycle, may be calculated based on the difference in rotation rate Δr, and the threshold value is set according to the increase amount X of the phase difference. Such a calculation method of the threshold value will be described below.

By using the following Equation 2, the increase amount X of the phase difference between the phase angle $\theta_{CA}$ of the triangle wave CA and the reference angle $\theta_s$ during one calculation cycle may be found:

$$X = |\Delta r| \times T \times K_p \times P / 60 \times 360° \quad \text{Equation 2}$$

wherein

X is an increase amount of the phase difference between the phase angle $\theta_{CA}$ of the triangle wave CA and the reference angle $\theta_s$ during one calculation period, Δr is a difference between the actual rotation rate Rma of the rotor and the rotation rate Rmm of the rotor stored in the triangle wave generating element 4, T is a calculation cycle to calculate the phase difference between the phase angle $\theta_{CA}$ of the triangle wave CA and the reference angle $\theta_s$, $K_p$ is a designated pulse number, and P is the number of pole pairs of the rotor.

For example, when the equation 2 is calculated at Δr=1,000 rpm, T=0.1 msec, $K_p$=6, and P=6, X will be 21.8°. This represents that, when the rotation rate of the rotor 7 is changed rapidly and the actual rotation rate Rma becomes 1,000 rpm faster than the rotation rate Rmm stored in the triangle wave generating element 4, the phase difference between the phase angle $\theta_{CA}$ of the triangle wave CA and the reference angle $\theta_s$ is increased by 21.6° for every 0.1 milliseconds.

Figure 9:
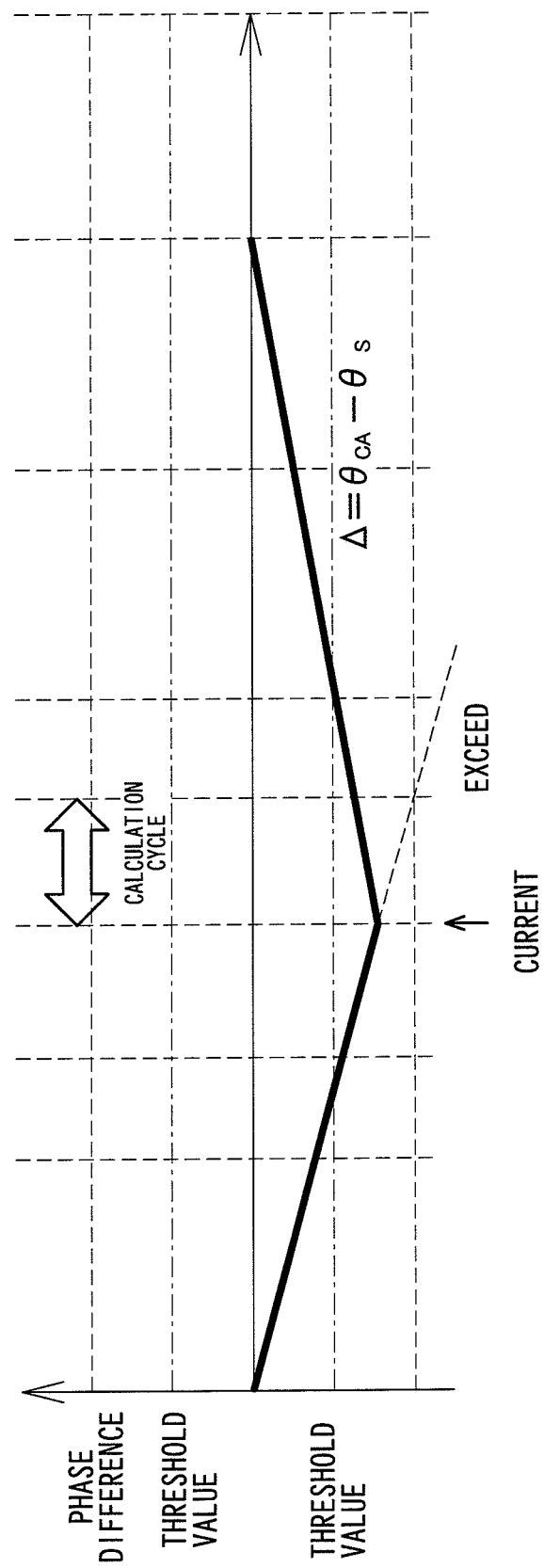
FIG. 9 shows still another example of the phase of the triangle wave and the reference angle and the phase difference therebetween when the motor actuation control according to the present invention is performed.

While the increase amount of the phase difference between the phase angle $\theta_{CA}$ of the triangle wave CA and the reference angle $\theta_s$ is determined from Equation 2, then the threshold value can be set. Specifically, as the increase amount of the phase difference between the phase angle $\theta_{CA}$ of the triangle wave CA and the reference angle $\theta_s$ during one calculation cycle is 21.6°, the threshold value to be set is ±158° from 180°−21.6°. In other words, as shown in FIG. 9, if the current phase difference between the phase angle $\theta_{CA}$ of the triangle wave CA and the reference angle $\theta_s$ is at or above 158.4°, or at or below −158.4°, the frequency of the triangle wave CA is changed.

In addition, the calculation cycle used in the above example is 0.1 milliseconds, but if the calculation cycle is set to 0.2 ms, for example, the threshold value to be set will be ±136.8°.

Changing the Cycle of the Triangle Wave CA

A method to determine whether or not the frequency of the triangle wave is changed based on the phase difference between the phase angle $\theta_{CA}$ of the triangle wave CA and the reference angle $\theta_s$ has been described above. When it is determined that the frequency of the triangle wave CA should be changed, the triangle wave CA is changed as described below.

In this embodiment, when it is determined that the frequency of the triangle wave should be changed, the triangle wave generating element 4 increases or decreases a predetermined percentage of frequency from the current frequency. Specifically, the triangle wave generating element 4 changes the frequency of the clock signal CLK by setting a coefficient a in the following Equation 3:

$$\text{New clock frequency} = \text{Current clock frequency} \times (1+a) \quad \text{Equation 3}$$

In the above equation, a is a coefficient which may be any real number; for example, if it is desired to increase the frequency of the triangle wave CA by 10 percent, a may be set to 0.1. It should be noted that a=0 while the motor actuation control continues smoothly. On the other hand, if it is desired to decrease the frequency of the triangle wave CA by 10%, a is −0.1 according to the above Equation 3.

In the embodiments described above, after changing the clock frequency $f_{CLK}$ during one rotation of the rotor, the control unit 1 returns to calculate the rotation rate of the rotor according to one rotation of the rotor 7, and again sets the clock frequency $f_{CLK}$ based on the obtained rotation rate of the rotor. Instead, after changing the frequency of the triangle wave CA during one rotation of the rotor 7, the clock frequency $f_{CLK}$ may be fixed for a predetermined period of time to stably secure the pulse number of the PWM signal PI.

Instead of calculating the reference angle $\theta_s$ by multiplying the rotor electrical angle $\theta_m$ by the designated pulse number $K_p$, it is also possible to calculate a reference angle $\theta_s'$ by dividing the phase angle $\theta_{CA}$ of the triangle wave CA by the designated pulse number $K_p$ to measure the phase difference between the reference angle $\theta_s'$ and the rotor electrical angle $\theta_m$.

Although the rotor rotation rate Rm is calculated for each rotation of the rotor in this embodiment, the calculation timing of the rotor rotation rate may be set arbitrarily. Even so, the advantage of the present invention can be provided by setting a shorter calculation cycle of calculating the phase difference between the phase angle $\theta_{CA}$ of the triangle wave CA and the reference angle $\theta_s$ than the calculation cycle of the rotor rotation rate.

APPLICABLE FIELD OF THE INVENTION

The present invention is applicable to the field of motor actuation control provided on motor vehicles including electric vehicles and hybrid vehicles.

PARTS LIST

1: Control Unit
2: Motor

3: Command Signal Generating Element
4: Triangle Wave Generating Element
5: PWM Control Element
6: Rotational Angle Sensor
7: Rotor
8: HV Control Module
9: Clock Signal Generator
10: Inverter

What is claimed is:

1. A motor actuation control device, comprising:
   a control unit for outputting a command signal and a triangle wave to generate a PWM signal and controls the actuation of a motor by the PWM signal; and
   an angle sensor for detecting a rotor electrical angle,
   wherein the control unit outputs the command signal by determining a voltage value of the command signal based on the rotor electrical angle and a torque requirement value,
   calculates a rotation rate of the rotor for a first cycle based on the rotor electrical angle,
   determines a frequency of the triangle wave for the first cycle based on the rotation rate of the rotor to output the triangle wave,
   detects a phase difference between the phase angle of the triangle wave and the rotor electrical angle for a second cycle shorter than the first cycle,
   and changes the frequency of the triangle wave when the value of the phase difference between the phase angle of the triangle wave and the rotor electrical angle exceeds a predetermined threshold value.

2. A motor actuation control device according to claim 1, characterized in that
   the control unit stores the number of pulses to be output by the PWM signal during one cycle of the command signal as a designated pulse number,
   calculates a reference angle by multiplying the rotor electrical angle by the designated pulse,
   detects the phase difference between the phase angle of the triangle wave and the reference angle and
   changes the frequency of the triangle wave when the phase difference between the phase angle of the triangle wave and the reference angle exceeds a threshold value.

3. A motor actuation control device according to claim 2, wherein ±180° is set as the threshold value.

* * * * *